(12) United States Patent
Verhoeven

(10) Patent No.: US 7,919,895 B2
(45) Date of Patent: Apr. 5, 2011

(54) SQUIRREL-CAGE ROTOR OF AN ASYNCHRONOUS MACHINE

(75) Inventor: Daniel Verhoeven, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 260 days.

(21) Appl. No.: 11/994,020

(22) PCT Filed: Jun. 23, 2006

(86) PCT No.: PCT/EP2006/063488
§ 371 (c)(1),
(2), (4) Date: Dec. 27, 2007

(87) PCT Pub. No.: WO2007/000413
PCT Pub. Date: Jan. 4, 2007

(65) Prior Publication Data
US 2008/0185934 A1    Aug. 7, 2008

(30) Foreign Application Priority Data
Jun. 29, 2005   (DE) ................. 10 2005 030 377

(51) Int. Cl.
*H02K 17/16*   (2006.01)
(52) U.S. Cl. ......................................... 310/211
(58) Field of Classification Search ........... 310/211–212
See application file for complete search history.

(56) References Cited

U.S. PATENT DOCUMENTS

| | | | | |
|---|---|---|---|---|
| 1,508,152 A | * | 9/1924 | Alger | 310/212 |
| 4,158,225 A | * | 6/1979 | Hertz | 363/150 |
| 5,341,058 A | * | 8/1994 | Kohler et al. | 310/87 |

FOREIGN PATENT DOCUMENTS

| | | |
|---|---|---|
| CH | 232 999 | 9/1944 |
| DE | 10 154 A | 8/1955 |
| EP | 0 786 855 A1 | 7/1997 |
| EP | 1 453 180 A2 | 9/2004 |
| JP | 51-114606 | * 10/1976 |
| JP | 60005764 A | 1/1985 |
| JP | 05-050981 U | 7/1993 |
| JP | 08-149769 | * 6/1996 |
| JP | 10174389 A | 6/1998 |

(Continued)

OTHER PUBLICATIONS

English Translation of JP51-114606, Nagao, Published Oct. 8, 1976.*

*Primary Examiner* — Burton Mullins
(74) *Attorney, Agent, or Firm* — Henry M. Feiereisen; Ursula B. Day

(57) ABSTRACT

The invention relates to an asynchronous motor comprising a stator or a cage rotor, said cage rotor comprising a shaft (1) and a laminated bundle (2) and rotor rods (3) are arranged within the laminated bundle, running through the openings (10) of each end plate (9) at both ends of the laminated bundle (2) and terminated with a short-circuit ring (4) which electrically connects the ends of the rotor rods (3) on one side of the cage rotor. Each end plate (9) comprises a circumferential projection which at least partly covers the short circuit ring (4) on the outside thereof with a positive fit and each end plate (9) contains a part of the rotor rod (3) and a part of the short circuit ring (4).

8 Claims, 7 Drawing Sheets

FOREIGN PATENT DOCUMENTS

| | | |
|---|---|---|
| JP | 10322990 A | 12/1998 |
| JP | 2000014105 A | 1/2000 |
| RU | 21 68 832 A | 9/1998 |
| RU | 2133072 C1 | 7/1999 |
| SU | 547928 A | 3/1977 |
| SU | 1239788 A1 | 6/1986 |
| SU | 1283900 A1 | 1/1987 |
| SU | 1529361 A1 | 12/1989 |
| SU | 1552297 A1 | 3/1990 |

\* cited by examiner

SQUIRREL-CAGE ROTOR OF AN ASYNCHRONOUS MACHINE

BACKGROUND OF THE INVENTION

The invention relates to an asynchronous machine with a stator and a squirrel-cage rotor, the squirrel-cage rotor having a shaft and a laminate stack, and rotor bars being located in the laminate stack, which rotor bars are guided at both ends of the laminate stack through the openings of in each case one end plate and are terminated with a short-circuiting ring, which electrically conductively connects the ends of the rotor bars of one side of the squirrel-cage rotor.

Electrical machines are used in a very large number of technical fields. With electrical machines it is necessary to distinguish between DC machines, AC machines and three-phase machines. Three-phase machines can be split into three-phase synchronous machines and three-phase asynchronous machines.

All of these electrical machines contain, inter alia, a stator at rest and a rotor which is mounted such that it is capable of rotating. The rotor is fitted with a winding system, depending on the design. This winding system may comprise one or more wire windings or bar windings. Squirrel-cage windings can also be constructed from wire windings or else bar windings. In the case of bars and squirrel-cage windings in asynchronous motors, the result is a squirrel-cage rotor. In this case, the laminate stack of the rotor contains rotor bars, which are conductively connected to one another at their ends by means of short-circuiting rings.

It is known that the transition region between the rotor bars and the short-circuiting rings is subjected to shear stress when the rotor is heated during operation, so that breakage of the joint may occur. This is primarily because of the different expansion of the rotor laminate stack and the short-circuiting rings during heating and centrifugal forces during operation. The document JP 2000-014105-A therefore proposes designing the ends of the rotor bars and the short-circuiting rings in such a way that they are reinforced, so that the rotor bars and the short-circuiting rings have a greater cross-sectional area in common. Furthermore, it is also known from the document EP 1 453 180 A2 to guide the rotor bars on each side through an end plate before the short-circuiting ring is joined.

However, one disadvantage is the fact that although the risk of breakage of a joint between a rotor bar and a short-circuiting ring is reduced, a breakage can still nevertheless occur.

SUMMARY OF THE INVENTION

The invention is therefore based on the object of providing an asynchronous machine with a squirrel-cage rotor, in which a breakage of the joint between a rotor bar and a short-circuiting ring is avoided.

This object is achieved in accordance with the invention by virtue of the fact that each end plate has a peripheral projection, which at least partially covers the short-circuiting ring on its outer side in an interlocking manner.

This advantageously means that each short-circuiting ring is held and clamped in on its outer side by an end plate, as a result of which the short-circuiting ring cannot expand to too great an extent on heating during operation and shear stress and breakage of the transition region between the rotor bars and the short-circuiting rings are prevented. Furthermore, the short-circuiting ring is also kept safely in its position at high rotation speeds and high centrifugal forces.

A further advantageous configuration results if the rotor bars have, at their ends, a thickened portion with an enlarged bar cross section, the thickened portion of the rotor bars lying in the end plate. The transition region between the rotor bars and the short-circuiting rings therefore has an even better and more stable design and the risk of breakage is again reduced.

Furthermore, the transition between the thickened portion and the short-circuiting ring is advantageously in the form of a rounded portion with a transition radius. This eliminates corner points which are in danger of breaking and at which particularly high shear stresses occur.

In order to arrange the thickened portions better on the circular cross section, they can also be arranged slightly offset with respect to the rotor bars. This advantageously means, for example, that a thickened portion does not protrude beyond the edge of the squirrel-cage rotor.

The number of apertures in an end plate can be equal to or less than the number of rotor bars. In the first case, particularly precise and reliable guidance of the rotor bars is achieved, so that the rotor bars are protected from breakage by the end plate. In the second case, a plurality of rotor bars are guided through one opening in the end plate, which is particularly advantageous if the end plate is intended to be manufactured simply and cheaply.

A further advantageous configuration results if each end plate has a further peripheral projection, which at least partially covers the short-circuiting ring on its inner side in an interlocking manner. Thus, not only the outer side of the short-circuiting ring is therefore supported by the end plate, but also the inner side. This guidance also serves the purpose, inter alia, of protecting the short-circuiting ring from mechanical damage.

Furthermore, the transition points in the profile of the rotor bars and/or the short-circuiting rings in the region clamped in by an end plate can be in the form of a rounded portion with a transition radius. This avoids corner points which are in danger of breaking and therefore increases the strength and reliability of the squirrel-cage rotor.

The end plate is advantageously designed such that it has a comparatively small material thickness in the region of the connection to the shaft or has such a large central opening that the shaft is not touched. The two alternative measures save on material and reduce the moment of inertia of the squirrel-cage rotor.

BRIEF DESCRIPTION OF THE DRAWING

Advantageously, the rotor bars and the short-circuiting rings are manufactured from a highly electrically conductive material such as copper or aluminum from one part, or are cast as one part.

Furthermore, it is conceivable to provide radially outwardly running and/or tangentially running grooves on that side of the short-circuiting ring which faces away from the rotor bars, so that advantageous cooling of the short-circuiting ring occurs particularly during operation of the asynchronous machine.

Figure 1:
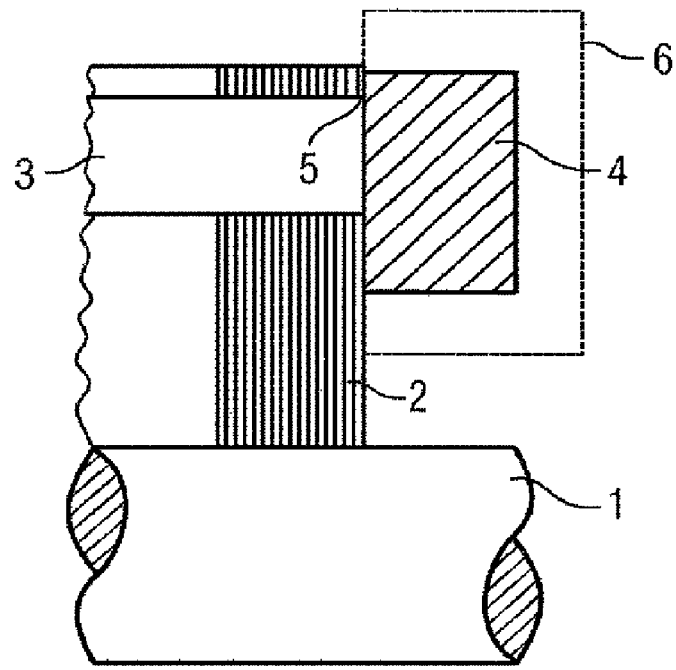
Figure 2:
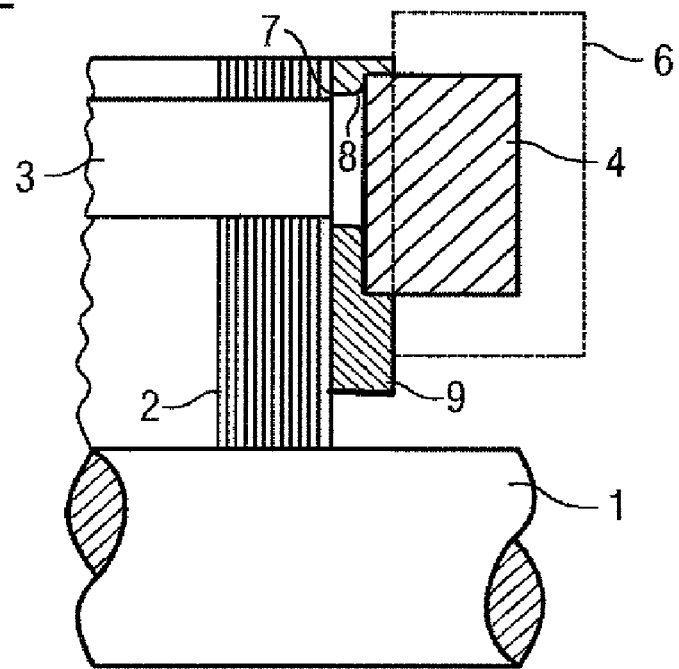
Figure 3:
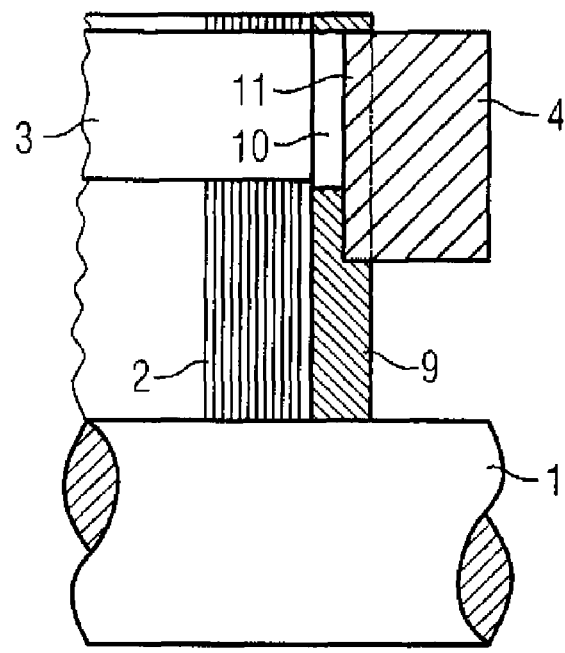
Figure 4:
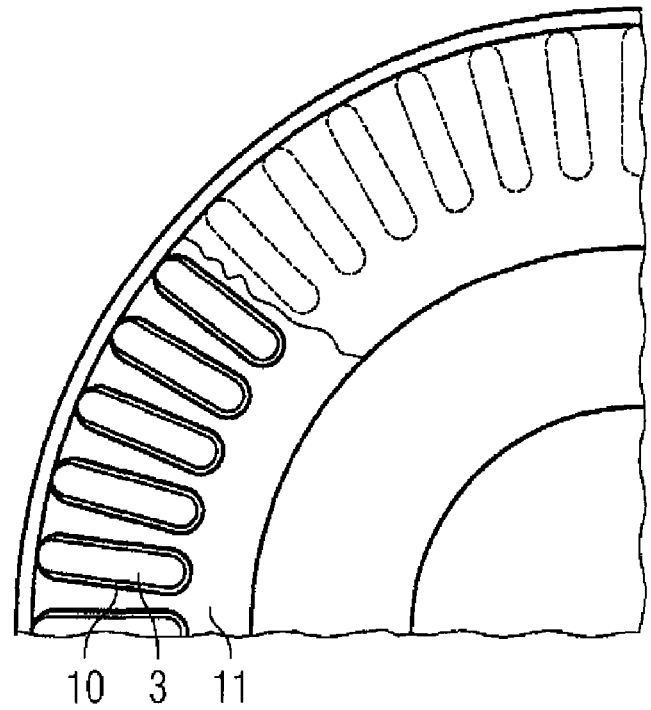
Figure 5:
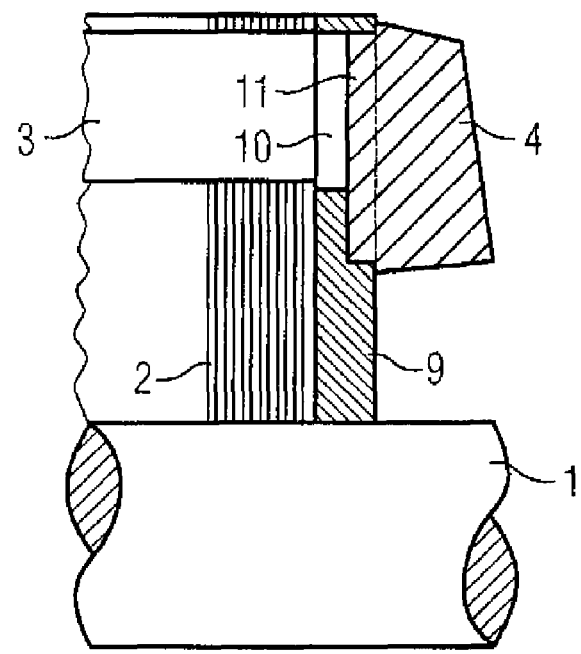
Figure 6:
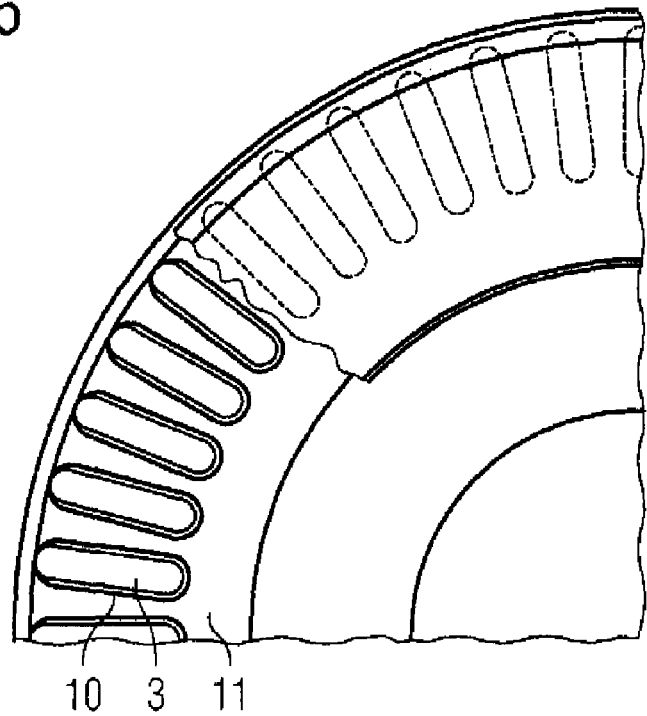
Figure 7:
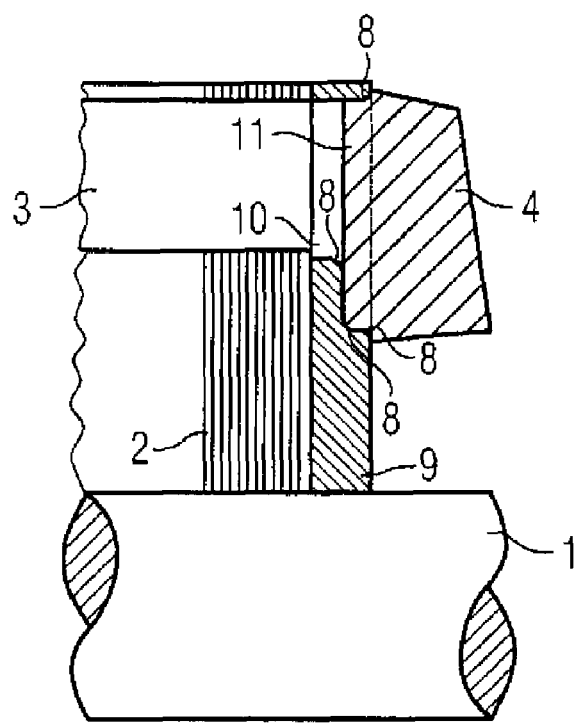
Figure 8:
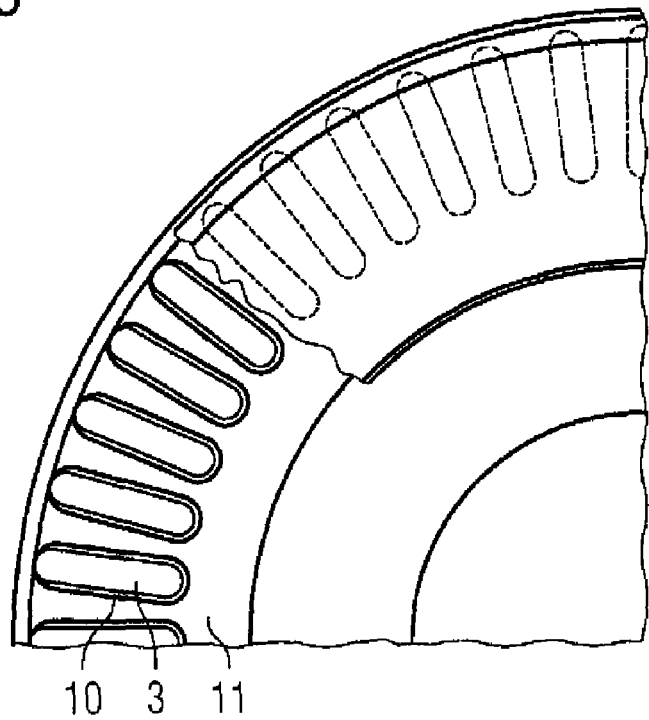
Figure 9:
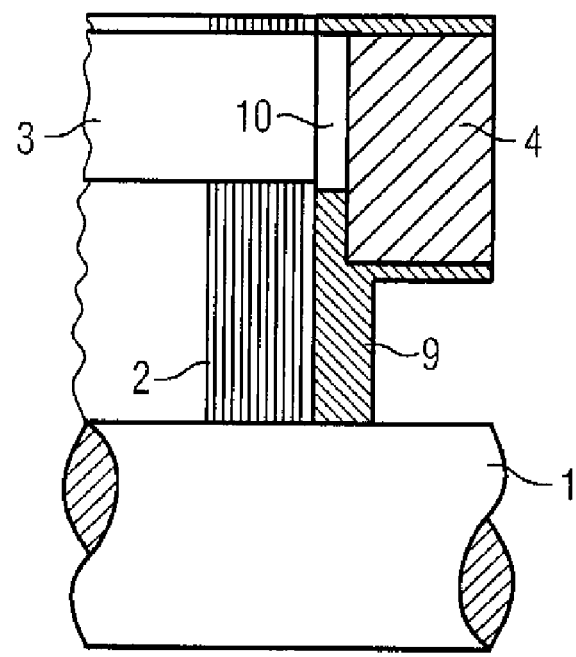
Figure 10:
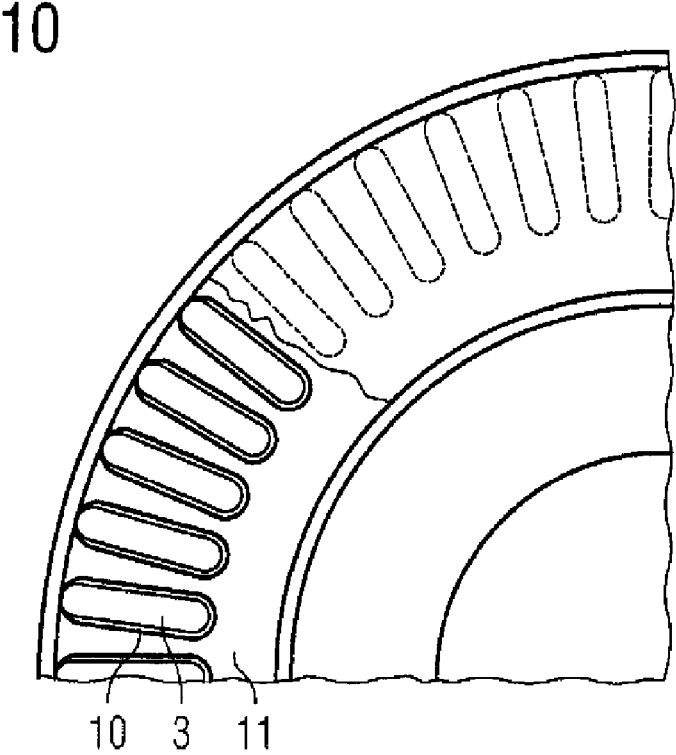
Figure 11:
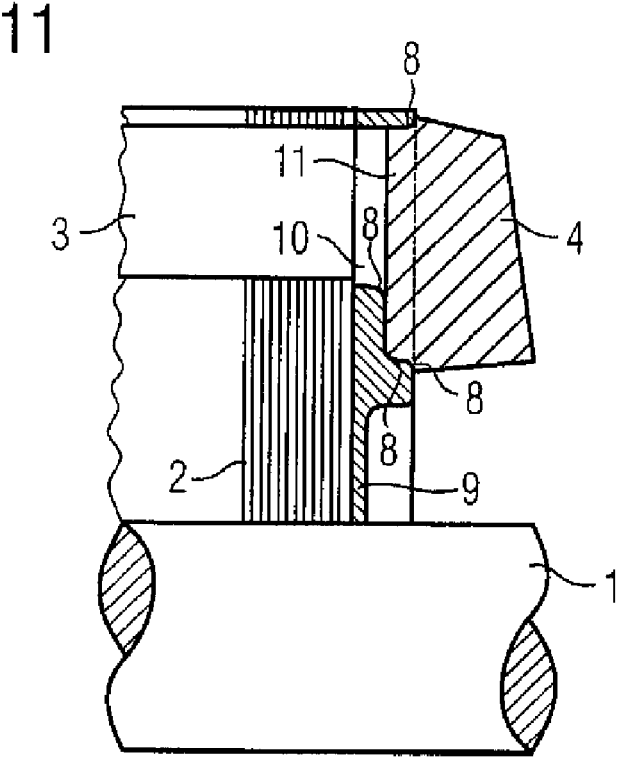
Figure 12:
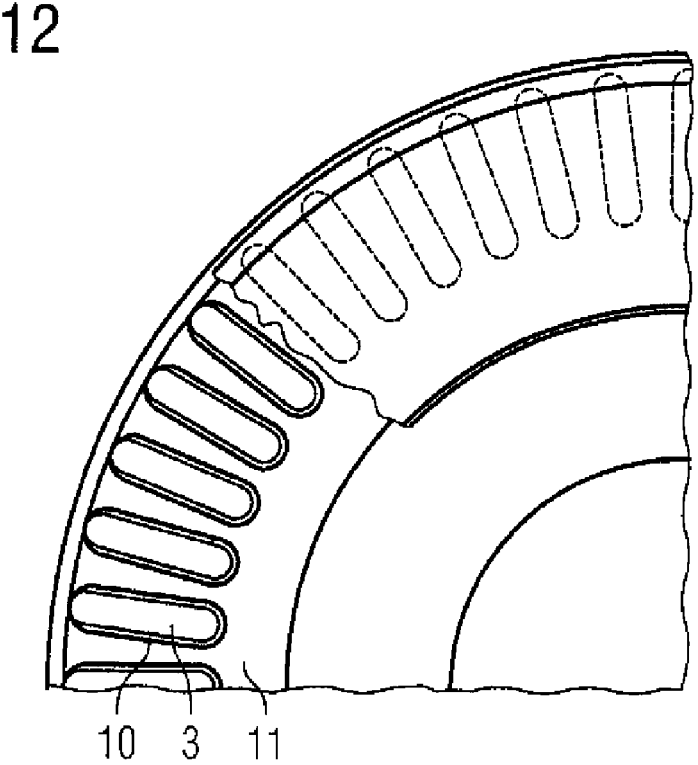
Figure 13:
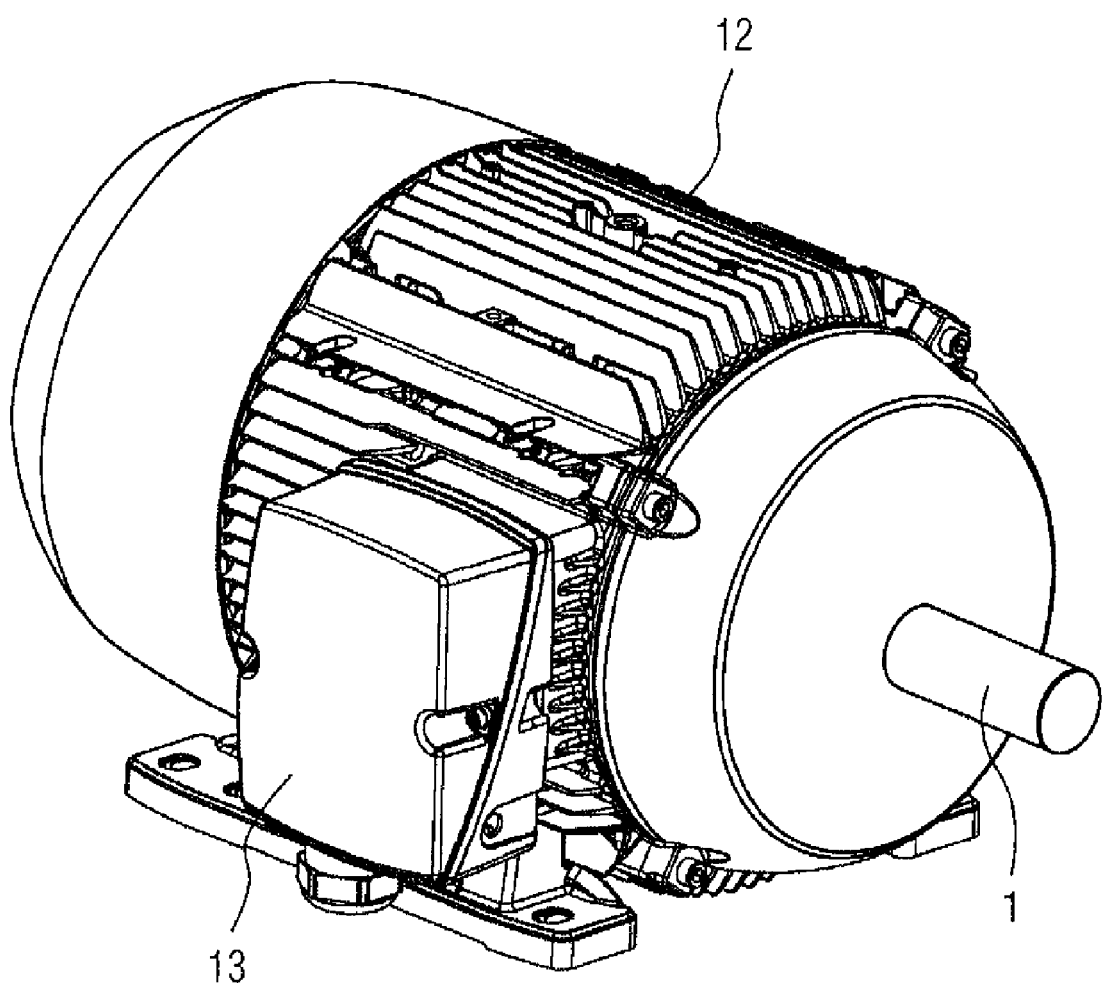

The invention and further advantageous configurations of the invention in accordance with the features of the dependent claims will be explained in more detail below with reference to schematically illustrated exemplary embodiments in the drawing, without the invention thereby being restricted to this exemplary embodiment; in which drawing:

FIG. 1 shows part of a squirrel-cage rotor in accordance with the prior art;

FIG. 2 shows part of a squirrel-cage rotor according to the invention;

FIG. 3 shows part of a further squirrel-cage rotor according to the invention;

FIG. 4 shows part of the squirrel-cage rotor according to the invention shown in FIG. 3;

FIG. 5 shows part of a further squirrel-cage rotor according to the invention;

FIG. 6 shows part of the squirrel-cage rotor according to the invention shown in FIG. 5;

FIG. 7 shows part of a further squirrel-cage rotor according to the invention;

FIG. 8 shows part of the squirrel-cage rotor according to the invention shown in FIG. 7;

FIG. 9 shows part of a further squirrel-cage rotor according to the invention;

FIG. 10 shows part of the squirrel-cage rotor according to the invention shown in FIG. 9;

FIG. 11 shows part of a further squirrel-cage rotor according to the invention;

FIG. 12 shows part of the squirrel-cage rotor according to the invention shown in FIG. 11; and FIG. 13 shows an exemplary asynchronous machine.

DETAILED DESCRIPTION OF PREFERRED EMBODIMENTS

FIG. 1 shows part of a squirrel-cage rotor in accordance with the prior art. In the case of rotating electrical machines which function on the induction principle, the squirrel-cage windings in the rotor are produced from highly electrically conductive material, preferably copper or aluminum. This squirrel-cage winding firstly comprises a specific number of rotor bars 3 with a defined cross section, which rotor bars are embedded in the rotor laminate stack 2. Secondly, in each case one short-circuiting ring 4, which connects all the rotor bars 3 of the corresponding rotor side to one another, i.e. short-circuits them electrically, is located on the end sides of the laminate stack. At present, rotor windings are produced from aluminum, inter alia using diecasting processes.

FIG. 1 shows that the laminate stack 2 is located between two diecasting molds 6 arranged at the end side during casting, so that a mold cavity results, which comprises the rotor bars 3 in the laminate stack 2 and the short-circuiting rings 4 and which is completely filled with aluminum. This basic arrangement also applies to other casting materials. The short-circuiting ring 4 has a considerably larger cross section than the individual rotor bars 3, in the illustration shown in FIG. 1 a sharp-edged transition 5 resulting between these two cross sections. During operation of the machine, this structure is subjected to mechanical and thermal loads. The laminate stack 2 is fitted on the shaft 1.

In general, the machine is operated at variable rotation speeds and on variable loads, with the result that these stresses become dynamic. As a result of the relatively large volume, comparatively high centrifugal forces act on the short-circuiting ring 4. When using aluminum, it is additionally necessary to take into consideration the fact that the coefficient of thermal expansion of this material is approximately twice as high as that of steel, i.e. with the load-dependent temperature development in the rotor the short-circuiting ring 4 is enlarged to a greater extent than the laminate stack 2. These two effects result in a radial displacement of the short-circuiting ring towards the outside. The rotor bars 3 cannot follow this movement unimpeded as a result of the fact that they are embedded in the laminate stack 2, which, as a result of the shear stress at the notch 5 can result in impermissibly high stresses and in breakage of the joint between the rotor bars 3 and the short-circuiting rings 4. Particularly in the case of squirrel-cage windings made from aluminum, this effect severely restricts the range of applications of the rotors as regards the operating conditions of the electrical machine (rotation speed, load).

FIG. 2 shows part of a squirrel-cage rotor according to the invention. In the case of the squirrel-cage rotor according to the invention, the high shear stress at the joint between the rotor bars 3 and the short-circuiting rings 4 is directly suppressed. The solid end plate 9 contains any desired part of the short-circuiting ring cross section and optionally an enlarged bar cross section 7 or a transition radius 8 or both. The short-circuiting ring 4 is therefore prevented from bending radially outwards and breaking off at the transition point at risk.

The end plate 9 therefore contains part of the rotor bar 3 and part of the short-circuiting ring 4. By means of this measure, the transition which is at risk between a rotor bar 3 and a short-circuiting ring 4 is completely reinforced by higher-strength material. The advantage is the fact that only one component needs to be used and it is no longer necessary for subsequently laid reinforcements of the short-circuiting ring to be cast. As a result, the operational range of cast rotors as regards rotation speed and temperature loading is extended in a simple manner.

Alternatively, the rotor winding is not produced using the casting process but is formed from semifinished products (bars and rings), preferably made from copper, and therefore makes higher stresses possible.

FIG. 3 shows part of a further squirrel-cage rotor according to the invention. In FIG. 3, the end plate 9 for each rotor bar 3 contains an opening 10, which does not need to precisely correspond to the cross section of the rotor bar and can also be arranged differently in principle in the radial position, as long as the resultant cross-sectional transition remains acceptable from a manufacturing point of view and from the point of view of operational characteristic data of the electrical machine. In addition, the end plate 9 contains the portion in accordance with the invention of the short-circuiting ring 11 in rotationally symmetrical form. It is also possible to combine a plurality of rotor bars 3 in one opening 10 in the end plate 9. FIG. 4 shows part of the squirrel-cage rotor according to the invention shown in FIG. 3 from a different viewing angle.

FIG. 5 is similar to FIG. 3, except that that part of the short-circuiting ring 4 which is outside of the end plate 9 is designed to have any desired cross section. FIG. 6 shows part of the squirrel-cage rotor according to the invention from FIG. 5 from a different viewing angle.

As a further configuration, FIG. 7 shows an end plate 9, which has transition radii 8 at one or more possible points. FIG. 8 shows part of the squirrel-cage rotor according to the invention from FIG. 7 from a different viewing angle.

FIG. 9 illustrates a further embodiment according to the invention, in this case the entire cross section of the short-circuiting ring 4 being located within the end plate 9. FIG. 10 shows part of the squirrel-cage rotor according to the invention from FIG. 9 from a different viewing angle.

As a further detailed illustration, FIG. 11 shows an embodiment in which the end plate 9 is reduced in terms of material thickness in the region of the connection to the shaft 1, or in which a connection is completely dispensed with. It is also conceivable for radially outwardly running and/or tangentially running grooves to be provided on that side of the short-circuiting ring 4 which faces away from the rotor bars 3, so that cooling of the short-circuiting ring 4 occurs during operation of the asynchronous machine. FIG. 12 shows part of the squirrel-cage rotor according to the invention from FIG. 11 from a different viewing angle.

FIG. 13 shows an exemplary asynchronous machine with a housing 12 and a terminal box 13.

What is claimed is:

1. An asynchronous machine, comprising:
a stator; and
a squirrel-cage rotor having
a shaft,
a laminate stack mounted on the shaft and having an axial end,
 a solid end plate positioned on the axial end of the laminate stack,
 a rotor bar located in the laminate stack and having a thickened portion of enlarged cross section received in an opening of the end plate at a distance to a laminate-stack distal end surface of the end plate, and
 a short-circuiting ring disposed in spaced-apart relation to the shaft and in electric conductive connection with the thickened portion of the rotor bar within the opening of the end plate, said short-circuiting ring being supported by a peripheral projection of the end plate said peripheral projection of the end plate at least partially embracing the short-circuiting ring in a formfitting manner,
wherein the end plate is made of a material having a strength which is higher than a strength of the rotor bar and the short-circuiting ring, and
wherein a transition between the thickened portion of the rotor bar and the short-circuiting ring is in the form of a rounded portion with a transition radius.

2. The asynchronous machine of claim 1, wherein a number of openings of an end plate is equal to a number of rotor bars.

3. The asynchronous machine of claim 1, wherein each end plate has a further peripheral projection which bears at least partially against an inner side of the short-circuiting ring in an interlocking manner.

4. The asynchronous machine of claim 1, wherein transition points in a profile of the rotor bars and/or the short-circuiting rings in a region clamped in by the end plate are configured in the form of a rounded portion with a predeterminable transition radius.

5. The asynchronous machine of claim 1, wherein the end plate has, in the region of the shaft, a comparatively small material thickness to prevent the end plate from touching the shaft.

6. The asynchronous machine of claim 1, wherein the end plate has, in the region of the shaft, a central opening sufficiently sized to prevent the end plate from touching the shaft.

7. The asynchronous machine of claim 1, wherein the rotor bars and the short-circuiting rings are manufactured from copper or aluminum.

8. The asynchronous machine of claim 1, wherein the rotor bars and the short-circuiting rings are cast as one piece using diecasting.

* * * * *

UNITED STATES PATENT AND TRADEMARK OFFICE
CERTIFICATE OF CORRECTION

| | |
|---|---|
| PATENT NO. | : 7,919,895 B2 |
| APPLICATION NO. | : 11/994020 |
| DATED | : April 5, 2011 |
| INVENTOR(S) | : Daniel Verhoeven |

It is certified that error appears in the above-identified patent and that said Letters Patent is hereby corrected as shown below:

Title Page, Item

[56]   References Cited, US PATENT DOCUMENTS

On page 1 of the cover page, column 2:

Add -- 5,719,457 to Helfer et al. --.

Signed and Sealed this
Twenty-seventh Day of March, 2012

David J. Kappos
*Director of the United States Patent and Trademark Office*